United States Patent Office 3,238,024
Patented Mar. 1, 1966

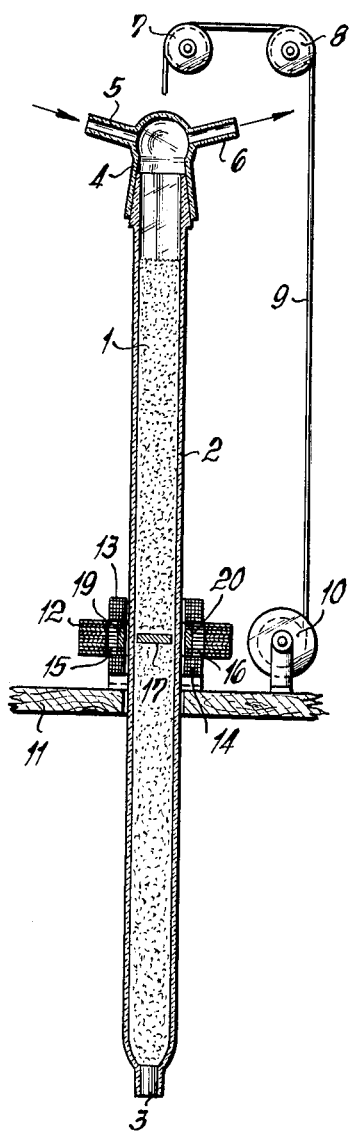
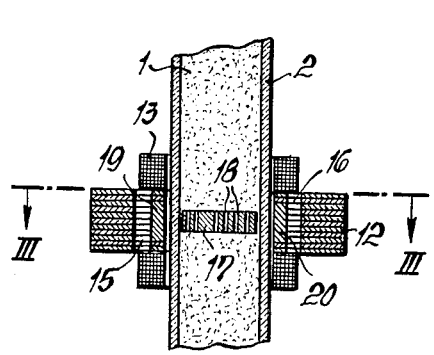
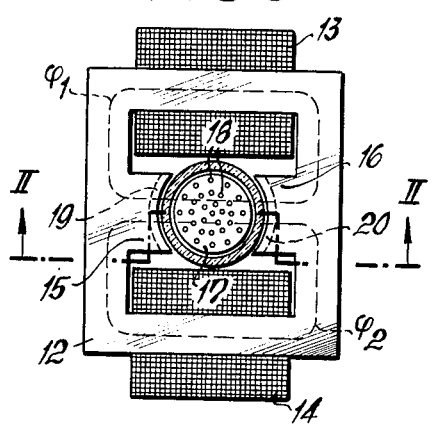
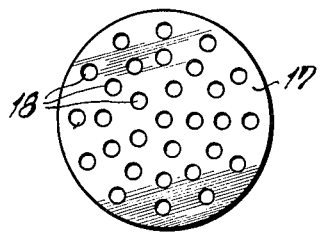

3,238,024
METHOD AND APPARATUS FOR THE ZONE-MELTING OF NONCONDUCTIVE OR POORLY CONDUCTIVE SUBSTANCES
Joseph Cremer, Hermulheim, near Cologne, Harri Kribbe, Knapsack, near Cologne, Friedbert Ritter, Buschhof uber Konigswinter, and Franz Rodis, Bad Hersfeld, Germany, assignors to Knapsack-Griesheim Aktiengesellschaft, Knapsack, near Cologne, Germany, a corporation of Germany
Filed Mar. 14, 1962, Ser. No. 179,641
Claims priority, application Germany, Mar. 14, 1961, K 43,183
7 Claims. (Cl. 23—301)

During recent years, the method of purification by zone melting has been added to the known customary methods of preparing substances in pure form, such as fractional distillation and crystallization, chromatography, ion-exchange reactions and distribution between two liquid phases.

In these methods, a narrow molten zone is caused to travel in longitudinal direction through a solid material in the shape of a bar. It is a prerequisite that the impurities which are to be removed dissolve in the melt of the substance to be purified. The purifying effect is based thereon that the impurities show a preference to accumulate in one of the two phases. In most cases, enrichment takes place in the liquid phase. In order to obtain a purifying effect, the segregation constant, i.e., the ratio of the impurity concentration in the solid to the impurity concentration in the melt at the limit between solid and liquid phase must be substantially different from 1. It may either be more than 1 or less than 1, depending on whether the impurity concentration in the solid or the impurity concentration in the liquid phase is the greater. If the impurities accumulate in the liquid phase, they will travel with the molten zone to the end of the bar and the starting end of the bar then consists of the pure material.

Conversely, if the impurities accumulate in the solid phase, then the end of the bar consists of the pure material. In order to complete the purification, the molten zone can be caused to travel several times through the material.

The method has achieved particular importance for the purification of metals such as germanium and silicon for the manufacture of semiconductors, but organic compounds have also been successfully purified.

Zone melting is in certain cases carried out in the manner that the material to be purified is passed slowly and uniformly through a narrow annular heating zone in an elongated boat which consists of a sufficiently resisting material, or else in a vertical tube, by means of some suitable device. The heating zone is produced for instance by electric heating coils, by hot air discharging from annular nozzles, by a concentration of solar energy and, for amounts of a few grams, also by concentration of the radiant energy of a projection lamp.

For the treatment of substances of high melting point such as silicones, the "floating zone" technique is also used, in which method contamination of the substances to be treated by the container is avoided. The bar which is to be purified is in this case clamped at both ends whereupon the molten zone is produced in the bar in vacuum or in a controlled atmosphere by induction heating or by electron bombardment.

As compared with the prior art, the present invention consists therein that in order to produce a sharply defined, displaceable molten zone, a ferromagnetic body is embedded in the material to be purified contained in a vertical pipe, said body being held in defined position by a magnetic field of force relative to a displaceable magnetic or electromagnetic exciting system, and being heated by an electromagnetic alternating field which passes through it and is also displaceable, as a result of the hysteresis and eddy current losses occurring in it.

The apparatus for the carrying out of this method is characterized by the fact that the pipe which is intended to receive the material to be purified and which can be closed at both ends is passed over a portion of its length between the poles of an electromagnetic alternating current generating system, and surrounded furthermore by a D.C.-exciter electromagnetic or permanent-magnet mounting system which is fixed in space with respect to the alternating current exciting system, and a ferromagnetic body which is easily movable with respect to the inside of the pipe is provided within the pipe, means of known type being provided to obtain a relative movement, taking place with adjustable speed in the direction of the longitudinal axis of the pipe, between the two systems and the pipe, for instance a uniformly driven, infinitely variable step-down gearing which operates on a cable drum or on a lead screw.

This ferromagentic body is coated, corresponding to the nature of the specific substance to be purified, with a covering of metal, a chemically non-attackable and sufficiently heat-resistant plastic or ceramic.

It is furthermore provided with boreholes which are parallel to its direction of motion and adapted in shape and design to the shape of the molten zone desired in the specific case.

For the treatment of substances which are particularly sensitive to heat, the ferromagnetic body is made of a thermomagnetic material of low Curie point, for instance of a Heusler alloy or of a nickel-iron alloy with about 25 to 35% nickel.

By the provision of damping rings, the planes of which are at right angles to the direction of the electromagnetic flux passing through same, the temperature distribution within the ferromagnetic body can be changed.

For holding the ferromagnetic body at a height defined with respect to the electromagnetic exciter system, a permanent magnetic field or a D.C., excited magnetic field can in addition be provided.

The replaceable electromagnetic exciting systems are designed for frequencies of 50 cycles to 50 megacycles. The pipe intended to receive the material to be purified is made of an electrically and magnetically non-conductive material, and can be closed at both ends.

At its upper end, it is provided with a cap which permits the passage of an inert gas with the exclusion of the outer air. For special cases, it may be advisable to surround the pipe with a jacket, so that a medium for cooling or heating can be passed through the space between the jacket and the pipe.

For continuous operation, the arrangement can be such in suitable cases that the starting end of a new pipe is attached directly to the end of the pipe which closes off its passage through the exciter and mounting systems.

The subject matter of the invention is shown schematically in the accompanying drawing. FIG. 1 is a vertical section through the entire apparatus, parts of which are comparatively unimportant in the present connection having been omitted or merely briefly indicated.

FIG. 2 is a detail in section and on an enlarged scale of a portion of the apparatus of FIG. 1 taken along line II—II of FIG. 3. FIG. 3 is a section taken along line III—III of FIG. 2, and FIG. 4 is a top view of an embodiment of a ferromagnetic body.

Referring to FIG. 1, the substance 1 which is to be purified is introduced into the pipe 2 shown by way of example in the form of a glass tube. This tube 2 is provided at the lower end with a closable opening 3 while its upper end bears in hermetic fashion a cap 4 which serves for the passage of a stream of an inert gas introduced through the pipe connection 5 and discharged through the pipe connection 6.

The pipe 2 is suspended in the example shown from the rope 9 which is guided over the pulleys 7 and 8 and wound up onto the rope drum 10. The rope drum 10 may be driven with variable speed of rotation in one direction or the other by an electric motor (not shown) arranged on the stationary table plate 11 and having an infinitely variable gearing. This then also results in the raising and/or lowering of the pipe 2.

There is also arranged on the table plate 11 the electromagnetic exciter system which consists essentially of the iron core 12 and the exciter windings 13 and 14. With correct polarity of the exciter windings 13 and 14, fed by the same single phase alternating current, there are produced two electromagnetic partial fluxes $\rho_1$ and $\rho_2$ which are directed opposite each other during each time unit and as a resultant total flux pass alternately for instance from the pole shoe 15 through the air space to the pole shoe 16 and vice versa.

A permanent-magnetic mounting system for supporting the action of the electromagnetic A.C. exciter system with respect to the mounting of the ferromagnetic body is obtained if permanent magnets 19 and 20, preferably magnets of a ceramic nature, consisting for instance of barium ferrite, are inserted in fixed position in recesses produced in the pole bore of 15 and 16.

An electromagnetic mounting system can on the other hand consist of D.C. windings which are arranged, in addition to the A.C. exciter windings 13 and 14 alongside, above or below same on the iron core 12.

The pipe 2 filled with the substance to be purified is guided at right angles to the plane of the iron core 12 through the air gap between the pole shoes 15 and 16. The ferromagnetic body 17 is so embedded in said substance that upon the commencement of the purification process, it is between the two pole shoes 15 and 16. After the exciting current has been turned on, it is heated by the hysteresis and eddy current losses produced in it upon its continued remagnetization and thereby causes the portions of the substance to be purified which are located in its immediate vicinity to melt. By the longitudinal pull of the magnetic lines of force, it is held thereby in the same position with respect to the exciter system. This also applies in the case of the presence of a relative movement between the pipe 2 and the exciting system, in which case the melting zone then travels slowly through the pipe. It is entirely immaterial in this connection whether the pipe 2 is stationary and the exciter system moves or whether the pipe moves with the exciter system stationary.

If it is desired to work with continuous operation, it may be advisable to arrange the pipe to receive the substance to be purified so that further pipelengths may be attached thereto, which lengths can then already be filled.

In the ferromagnetic body 17 there are provided, as shown in FIG. 4, parallel to its direction of motion, bores 18 which are intended to permit the passage of the melt for instance from the bottom of the body 17 to the top or vice versa.

The pipe 2 can be surrounded by a heating or cooling jacket, so that an additional heating or cooling of the contents of the pipe is possible.

All previously known devices have the disadvantage that they operate only with relatively small amounts of substance and do not permit enlargement. An increase of the rate of flow is only possible by allowing several units to operate alongside of each other since the speed of migration of the molten zone cannot be arbitrarily increased. With an increase in the cross-section, it is not possible with the previously known devices to produce a molten zone of constant width over the entire cross-section.

The present invention of a device for the zone melting of non-conductive or poorly conductive substances (in which connection as range limitation there is considered approximately the transition of the electrolytic conductivity to the less conductive semi-metals) overcomes this drawback and results in certain other advantages over the previously known processes. In the case of the apparatus described herein, the material which is to be purified is sealed in a vertical pipe. The pipe must consist of a non-conductive material such as glass, quartz, ceramic or plastic. The cross-section of the pipe can be selected as desired, depending on the quantity to be passed through. It can extend from a few millimeters to for instance a few decimeters. The heating of the molten zone is effected by a narrow, perforated body of ferromagnetic material which is located within the pipe. The pipe is surrounded on the outside by a magnet coil with or without iron core, depending on the frequency range. The coil is charged with alternating current and in the simplest case by alternating current from the power lines. The ferromagnetic body is then heated by the eddy current and re-magnetization losses. The molten zone is formed around the body. If the pipe is now pulled through the magnet coil, the body and thus the molten zone travel through the material since the body is held fast at all times within the coil by the magnetic field. In the case of larger and accordingly heavier pipes, the magnetic system is advisedly moved up and down by means of a suitable device. Of course, a plurality of magnet coils with corresponding magnet bodies can be arranged on the same pipe in order to obtain a multiplication of the purifying action. The impurities which in most cases collect in the melt can, in case of passage from the top to the bottom, be allowed simply to discharge from the pipe at the bottom. In case of passage in the opposite direction, the melt must be drawn off at the upper end of the pipe by means of a suitable suction device.

The particular advantage of the apparatus described is that a sharply delimited molten zone of practically any desired cross-section can be produced, the width of which can be adjusted extremely simply by regulating the current in the magnetic coil. If the current intensity required for heating the body should be so small that it is no longer sufficient to maintain the body floating in the magnetic field, this can be effected by an additional magnetic field which is produced by D.C. windings or permanent magnets.

By a suitable shaping of the ferromagnetic body, it is possible to influence the development of the molten zone. For instance, the outer edge can be heated particularly strongly by the application of damper rings of metal of good conductivity, such as copper, if it should turn out that the radiation toward the outside should be too great.

Another advantage is that in the apparatus described air or moisture-sensitive substances, such as yellow phosphorus, which are difficult to handle, can also be treated particularly well. The pipe, after the introduction of the substance, and of the magnet bodies can be either entirely closed under a protective gas such as hydrogen, nitrogen or argon, or the upper part of the pipe can be passed through by a protective gas.

The material of the ferromagnetic body can be adapted to the substance to be treated. Thus one may use iron and its ferromagnetic alloys, nickel, cobalt, and their alloys, as well as ferrites (homogeneous compounds of iron oxide with one or more oxides of other metals, for instance manganese, nickel or zinc). If particularly aggressive materials are to be treated, the ferromagnetic bodies can be provided with a covering of a suitable metal, of a thermally and chemically resistant plastic and at higher temperatures also of a ceramic material. Depending on the individual case, gold, silver, platinum, etc., constitute metals which can be used, polyvinyl chloride, phenyl resin, polyethylene and polytetrafluoroethylene, etc., plastics which can be used, and glass, enamel, sintered corundum and the like, ceramics which can be used. In each case the particular selection depends entirely on the chemical and thermal resistance necessary in the particular case.

The property of ferromagnetic substances to lose their ferromagnetic properties above the Curie point can also be utilized to protect sensitive substances against overheating. By the selection of a body of a material of corresponding Curie point, for instance of Heusler alloys of copper, manganese and aluminium or of nickel-iron alloys containing about 25 to 35% nickel, the body falls out of the magnetic field when such temperature is exceeded and cools down.

The attack on the wall of the container is lesser in this apparatus than in any of the known apparatuses, since the wall is always colder than the melt, since the temperature is produced within the pipe and need not be introduced from the outside through the wall.

It is readily possible to surround the pipe with a jacket so that a heating or cooling medium can be conducted through the annular space which is thus formed.

The following examples serve to illustrate the invention, but they are not intended to limit it thereto.

*Example 1a*

Yellow phosphorus is treated under nitrogen as protective gas in a glass pipe of a diameter of 40 mm. and a length of 800 mm., a silver-plated soft-iron body of a thickness of 10 mm. containing 19 bores of 5 mm. diameter being employed. The electromagnet was excited with 50 cycles alternating current. Upon a single pass of the molten zone, the sum of the inorganic impurities, which consisted to the greater part of arsenic and heavy metal phosphides, was reduced from 0.26% in the starting product to 0.01% and the sum of the organic impurities, which consisted primarily of hydrocarbons, from 0.54% to 0.1%.

*Example 1b*

In a second pass, the sum of the inorganic impurities was reduced to less than 0.001% and the sum of the organic impurities to 0.02%. The speed of travel of the molten zone was in this case—as it also was in the preceding example—20 mm. per hour.

*Example 2*

In a tube provided with a cooling jacket and also having a diameter of 40 mm. which is filled to a height of 500 mm., pure benzene was treated with the use of a body of soft iron and 50 cycles alternating current. An ice-water mixture was employed as coolant. The molten zone was moved from the bottom toward the top. After each pass, a layer of a height of about 40 mm. was drawn off from the top and discarded. The progress of the purification was established by determination of the melting point in each case in the remaining part. The melting point of the initial specimen as well as its increase after each pass can be noted from the following table:

|  | Degrees centigrade |
|---|---|
| Initial specimen | 5.06 |
| 1st pass | 5.19 |
| 2nd pass | 5.31 |
| 3rd pass | 5.42 |
| 4th pass | 5.50 |
| 5th pass | 5.50 |

The melting point of extremely pure benzene in accordance with the literature is between 5.49 and 5.52° C. Therefore, 4 passes are sufficient for purification.

We claim:

1. In the process of zone-refining phosphorus by melting with a ferromagnetic inductively heated susceptor a zone of the phosphorus substance to be refined having an electrical conductivity smaller than that of semiconductors and a melting point below the Curie point of the material used for the susceptor and moving said molten zone through said substance by effecting a relative motion between susceptor and substance, the improvement which comprises embedding the ferromagnetic susceptor in the substance to be refined and keeping said susceptor freely suspended in the molten zone by magnetic field forces while passing said molten zone through the substance to be refined and passing the substance through the susceptor.

2. An apparatus for zone refining substances having an electrical conductivity smaller than that of semiconductors which comprises a closed evacuated pipe consisting of electrically and magnetically non-conductive material for receiving the substance to be refined, an electromagnetic alternating current exciter system disposed adjacent said pipe, a ferromagnetic susceptor disposed within said pipe freely suspended in the substance to be refined and spaced from the inner surface of said pipe whereby said susceptor is readily movable with respect to the inside of the pipe, said susceptor being in the form of a perforated disc whereby said substance may pass therethrough, means holding said susceptor flush with said alternating current exciter system, said means being the magnetic field forces of said exciter system, and means to obtain a relative motion effected with adjustable speed in the direction of the longitudinal axis of the pipe between said alternating current exciter system and said pipe.

3. The apparatus of claim 2 including a permanent magnetic system disposed adjacent said electromagnetic alternating current system for cooperating with said electromagnetic system in maintaining said susceptor freely suspended.

4. The apparatus of claim 2 including a direct current system disposed adjacent said electromagnetic alternating current system for cooperating with said electromagnetic system in maintaining said susceptor freely suspended.

5. The apparatus of claim 2 wherein for treating substances which are particularly sensitive to heat the ferromagnetic body is made of a material having a low Curie point.

6. The apparatus of claim 5 wherein the ferromagnetic body is made of a Heusler alloy.

7. The apparatus of claim 5 wherein the ferromagnetic body is made of a nickel-iron alloy containing about 25–35% nickel.

References Cited by the Examiner

UNITED STATES PATENTS

| 1,862,120 | 6/1932 | Northrup | 219—10.49 |
| 2,601,212 | 6/1952 | Polydoroff | 18—475 |
| 2,887,560 | 5/1959 | Stanton et al. | 219—8.5 XR |
| 2,889,240 | 6/1959 | Rosi | 23—301 XR |
| 2,890,940 | 6/1959 | Pfann | 23—301 XR |
| 2,905,798 | 9/1959 | Freutel | 23—301 XR |
| 3,026,188 | 3/1962 | Wang | 23—301 |
| 3,124,633 | 3/1964 | Van Run | 23—301 XR |

FOREIGN PATENTS 818,757   8/1959   Great Britain.

OTHER REFERENCES

Pfann: Zone Refining, John Wiley and Sons Inc., New York, 1958. Chapter No. 4.

ROBERT F. BURNETT, *Primary Examiner.*

NORMAN YUDKOFF, ANTHONY SCIMANNA,
*Examiners.*